United States Patent
Kammerer et al.

(10) Patent No.: US 12,434,841 B2
(45) Date of Patent: Oct. 7, 2025

(54) LUGGAGE COMPARTMENT FOR AN AIRCRAFT

(71) Applicant: FACC AG, Ried im Innkreis (AT)

(72) Inventors: Bernhard Kammerer, Zell an der Pram (AT); Lukas Klembara, Bratislava (SK)

(73) Assignee: FACC AG, Ried im Innkreis (AT)

( * ) Notice: Subject to any disclaimer, the term of this patent is extended or adjusted under 35 U.S.C. 154(b) by 0 days.

(21) Appl. No.: 18/837,452

(22) PCT Filed: Feb. 10, 2023

(86) PCT No.: PCT/AT2023/060041
§ 371 (c)(1),
(2) Date: Aug. 9, 2024

(87) PCT Pub. No.: WO2023/150815
PCT Pub. Date: Aug. 17, 2023

(65) Prior Publication Data
US 2025/0153848 A1    May 15, 2025

(30) Foreign Application Priority Data
Feb. 10, 2022   (AT) .............................. A 50085/2022

(51) Int. Cl.
*B64D 11/00*   (2006.01)
(52) U.S. Cl.
CPC .................................. *B64D 11/003* (2013.01)
(58) Field of Classification Search
CPC .............................. B64D 11/003; B64D 11/00
See application file for complete search history.

(56) References Cited

U.S. PATENT DOCUMENTS 5,347,434 A    9/1994   Drake
5,823,472 A   10/1998   Luria
(Continued)

FOREIGN PATENT DOCUMENTS

CN      204433025 U    7/2015
DE        3904375 A1   8/1990
(Continued)

OTHER PUBLICATIONS

ISA European Patent Office, International Search Report Issued in Application No. PCT/AT2023/060041, Apr. 12, 2023, WIPO, 4 pages.

(Continued)

*Primary Examiner* — Brian M O'Hara
(74) *Attorney, Agent, or Firm* — McCoy Russell LLP

(57) ABSTRACT

A luggage compartment for an aircraft, comprising: a luggage compartment housing enclosing a storage space for a piece of hand luggage, a door part, a pivoting device, by means of which the door part can be pivoted between a closed position closing a loading opening of the luggage compartment housing and an open position releasing the loading opening of the luggage compartment housing, wherein the door part comprises a recess at an upper corner region, so that an adjoining section of the door part at the side of the recess is guided into the interior of the storage space during transfer from the closed position to the open position.

13 Claims, 3 Drawing Sheets

(56) References Cited

U.S. PATENT DOCUMENTS

| | | | |
|---|---|---|---|
| 8,955,805 B2 * | 2/2015 | Savian | B64D 11/0015 |
| | | | 244/118.5 |
| 9,499,272 B2 * | 11/2016 | Kearsey | A47B 46/005 |
| 10,801,244 B1 * | 10/2020 | Chadwell | E05D 3/06 |
| 11,293,208 B2 * | 4/2022 | Heimbach | E05D 3/02 |
| 11,945,587 B2 * | 4/2024 | Rheaume | B64D 11/003 |
| 12,326,025 B2 * | 6/2025 | Chadwell | E05F 1/1292 |
| 2012/0012702 A1 | 1/2012 | Moritz | |
| 2017/0227767 A1 | 8/2017 | Chen | |

FOREIGN PATENT DOCUMENTS

| | | | |
|---|---|---|---|
| EP | 2865597 A2 | 4/2015 |
| RU | 2219080 C1 | 12/2003 |
| WO | 2014117198 A1 | 8/2014 |
| WO | 2019070481 A1 | 4/2019 |

OTHER PUBLICATIONS

China Intellectual Property Administration, Office Action Issued in Application No. 202380020921.1, Dec. 21, 2024, 9 pages. (Submitted with Machine Translation).

* cited by examiner

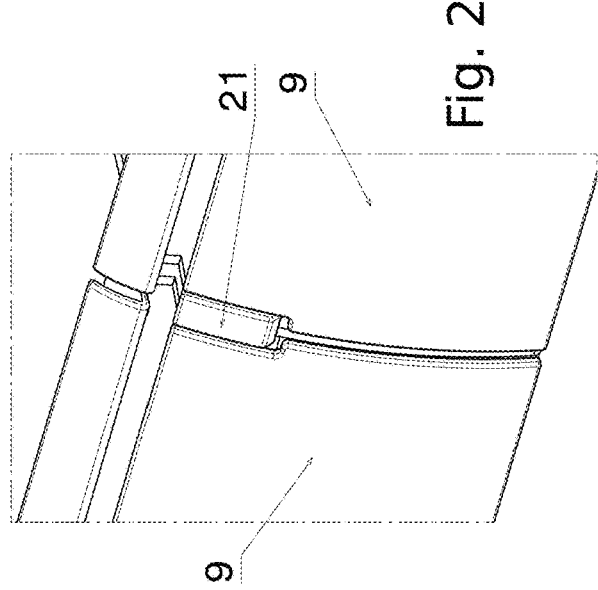
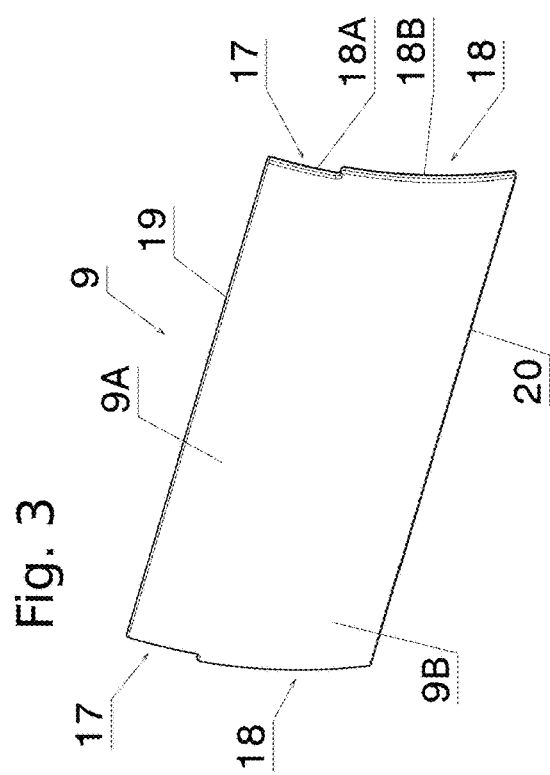
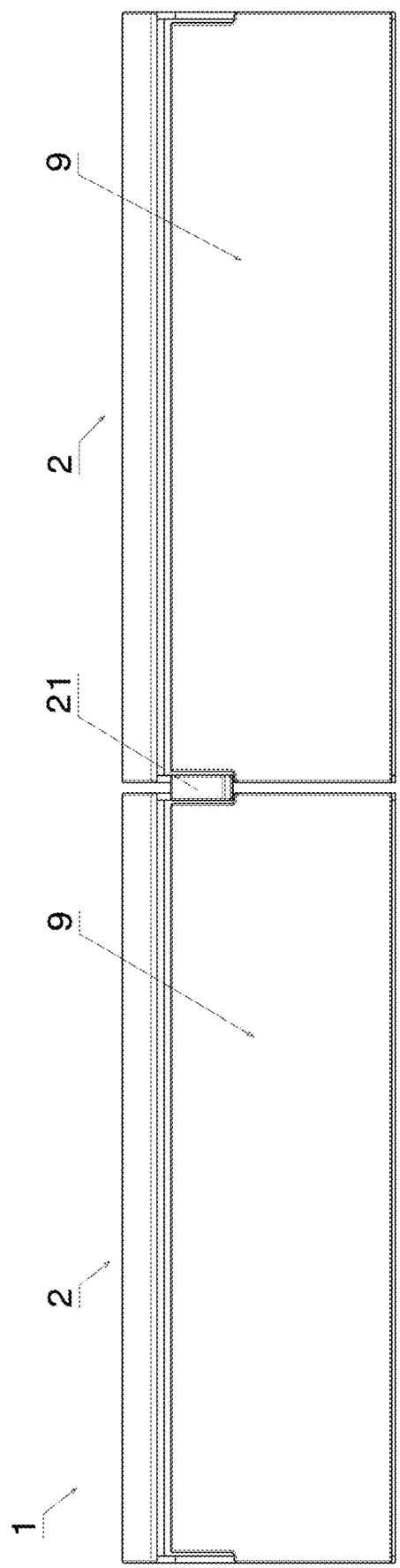

LUGGAGE COMPARTMENT FOR AN AIRCRAFT

CROSS REFERENCE TO RELATED APPLICATIONS

The present application is a U.S. National Phase of International Application No. PCT/AT2023/060041 entitled "LUGGAGE COMPARTMENT FOR AN AIRCRAFT," and filed on Feb. 10, 2023. International Application No. PCT/AT2023/060041 claims priority to Austrian Patent Application No. A 50085/2022 filed on Feb. 10, 2022. The entire contents of each of the above-listed applications are hereby incorporated by reference for all purposes.

TECHNICAL FIELD

The invention relates to a luggage compartment for an aircraft, comprising:
- a luggage compartment housing enclosing a storage space for a piece of hand luggage,
- a door part,
- a pivoting device with which the door part can be pivoted between a closed position closing a loading opening of the luggage compartment housing and an open position releasing the loading opening of the luggage compartment housing.

BACKGROUND AND SUMMARY

Furthermore, the invention relates to a luggage compartment unit with at least two luggage compartments.

Finally, the invention relates to an aircraft with a luggage compartment or a luggage compartment unit.

As described in WO2014/117198, overhead luggage compartments for aircrafts are known in various embodiments. In one embodiment, a fixed housing is provided, which is closed with a pivoted flap. Another embodiment has a lowerable bucket into which the hand luggage can be placed.

However, these overhead luggage compartments are not suitable for some types of aircraft with limited space. Complex special solutions have been developed for these applications. On the one hand, split flaps can be used, which protrude less far into the aisle area when open. However, this solution is not very intuitive to operate and is complex and stiff. On the other hand, an embodiment is known in which the flap is pivoted into the interior of the luggage compartment with the help of a coupling gear when it is opened. However, this embodiment takes up a lot of space, is even more complicated and requires a complex and vulnerable pivoting mechanism.

The general state of the art is further defined by US2012012702 A1, WO 2019070481 A1, EP 2865597 A2, RU 2219080 C1 and DE 3904375 A1.

In contrast, the object of the present invention is to alleviate or eliminate at least individual disadvantages of the prior art. In particular, the invention aims to create a luggage compartment which is easy and intuitive to operate and which, for an application in an aircraft with confined space conditions, extends less when opened, without placing special demands on the pivoting device.

This task is solved by a luggage compartment, a luggage compartment unit and an aircraft according to the present disclosure.

According to the invention, the door part comprises a recess at an upper corner region, so that an adjoining section of the door part at the side of the recess can be pivoted into the interior of the storage space when the door part is moved from the closed position to the open position.

In the closed position, the door part, also known as the flap, closes the loading opening leading into the storage space, which is bounded laterally by two side panels of the luggage compartment housing. In relation to the closed position, the door part comprises an upper edge, a lower edge and two opposite side edges. According to the invention, the recess is provided at the corner region where one of the side edges and the upper edge of the door part meet. Thus, the side edge comprises a first section along the recess and a second section adjacent to the recess. The first section of the side edge is offset inwards relative to the second section, so that the first section is arranged further inwards than the inside of the adjacent side panel of the luggage compartment housing. To open the luggage compartment, the pivoting device is actuated, causing the door part to pivot about a pivot axis, preferably extending substantially perpendicular to the side panel, relative to the fixed luggage compartment housing. Preferably, a one-piece door part is provided, which is swung up to load the storage space. When pivoting into the open position, the upper section of the door part, which adjoins the recess at the side, i.e. in a horizontal direction, can be guided behind the front loading opening into the interior of the storage space. The recess thus enables the pivoting of the upper section of the door part adjacent to the side panel of the luggage compartment housing. On the other hand, the lower section of the door part, which is adjacent to the upper section of the door part below the recess in the closed position, is also arranged outside the storage space in the open position, i.e. in front of the end face of the side panel. This offset also has the effect of reducing the noise that is introduced into the passenger compartment from outside the aircraft through the luggage compartment. By pivoting the upper section of the door part into the interior of the luggage compartment housing, preferably only the lower section of the door part protrudes in the open position in the direction perpendicular to the loading opening, i.e. in the direction of the aircraft aisle when in use. This results in a particularly space-saving arrangement in the open position, which is particularly suitable for aircraft types with limited space conditions. Another advantage is that the release of the pivoting via the recess is intuitive for the user and reliable even in continuous use. The design of the pivoting device can be kept simple.

For the purposes of this disclosure, the indications of location and direction, such as "up", "down", "horizontal", "vertical", refer to the intended state of use of the luggage compartment in an aircraft cabin when the aircraft is in a horizontal position. "Front" refers to the front of the luggage compartment facing the user.

In order to insert the upper section of the door part into the storage space on opposite sides next to the side panels of the luggage compartment housing when pivoting into the open position, it is advantageous if the door part comprises a recess at each of the two upper corner regions. Preferably, the recesses at the upper corner regions are essentially identical. The upper section of the door part is thus narrower than the lower section of the door part by twice the width of the recess. When opening, the upper section of the door part, which extends between the opposing recesses, is guided into the interior of the storage or receiving space.

In order to enable a compact arrangement in the open position with a structurally simple pivoting device, in a preferred embodiment the recess extends over less than half the length of the side edge of the door part, in particular over less than one third of the length of the side edge of the door part.

The width of the recess is preferably greater than the wall thickness of the side panel. Furthermore, the length of the recess, i.e. the extension along the side edge, is preferably greater, in particular several times greater, than the width of the recess. For example, the recess may comprise a length of 20 to 200 millimetres (mm), in particular of 70 to 130 mm, for example essentially 100 mm, and/or a width of 5 to 50 mm, in particular of 10 to 30 mm, for example essentially 15 mm.

In order to enable the pivoting movement without significantly impairing the integrity of the door part and the appearance, the recess in a preferred embodiment is essentially rectangular in plan view, i.e. in the direction of view perpendicular to the loading opening.

In order to create a surface for information details and/or a light element and also to ensure a substantially uniform surface in the closed position, in a preferred embodiment a covering part is connected to the luggage compartment housing, wherein the covering part substantially completely fills the recess in the closed position of the luggage compartment housing.

In a preferred embodiment, the outer side of the door part in the closed position is arranged essentially in the same plane as the outer side of the covering part.

In order to cover the side of the luggage compartment housing in the closed position essentially up to the outside of the side panel, it is advantageous if, in the closed position, the second (lower) section of the side edge of the door part below the recess is essentially flush with the outside of the side panel of the luggage compartment housing. The offset of the side edge creates a particularly low-noise embodiment.

In order to enable the transfer from the closed position to the open position, the pivoting device comprises a pivot arm in a preferred embodiment, which is connected to the door part and the side panel of the luggage compartment housing. Preferably, the pivot arm, in particular a first end region of the pivot arm, is pivotably connected to the side panel of the luggage compartment housing via a joint, in particular via a single joint with a pivot axis preferably extending substantially perpendicular to the side panel. Furthermore, the pivot arm, in particular a second end region of the pivot arm, is preferably fixedly connected to the inside of the door part, so that the door part is pivoted accordingly by pivoting the pivot arm.

To support the pivoting of the door part from the closed position to the open position, the pivoting device comprises a force support device, in particular with a spring and/or damper device, in a preferred embodiment. When the luggage compartment is closed, a spring element of the force support device can be tensioned and released when the luggage compartment is opened. The spring element can be a coil spring, for example. The damping element of the force support device can be, for example, a rotation damper, which is preferably arranged around the pivoting axis of the pivoting device.

For use in an aircraft, a luggage compartment unit with at least two identical luggage compartments is preferably provided, each in one of the embodiments described above. Depending on the type of aircraft, the luggage compartment unit may comprise a corresponding number of luggage compartments, for example at least three, in particular at least four, preferably at least five, luggage compartments, which may in particular be arranged next to one another at the same height.

In a preferred embodiment, the covering part essentially completely fills two adjacent recesses of the door parts of the luggage compartments in the closed position of the door parts. Thus, two luggage compartments can share a common covering part on the side panels facing each other, which essentially completely covers the recesses on the adjacent corner regions of the door parts. If three luggage compartments are provided, a common covering part can also be provided on the opposite side. The covering part can be attached to the side panel of one of the two adjacent luggage compartments.

An embodiment of the invention, which can be seen in the drawings, is explained in more detail below.

BRIEF DESCRIPTION OF THE FIGURES

FIG. 1 shows a luggage compartment unit according to the invention with two luggage compartments for an aircraft.

FIG. 2 shows a detailed view of the luggage compartment unit of FIG. 1.

FIG. 3 shows a door part of the luggage compartment unit of FIGS. 1 and 2.

DETAILED DESCRIPTION

Figure 6:
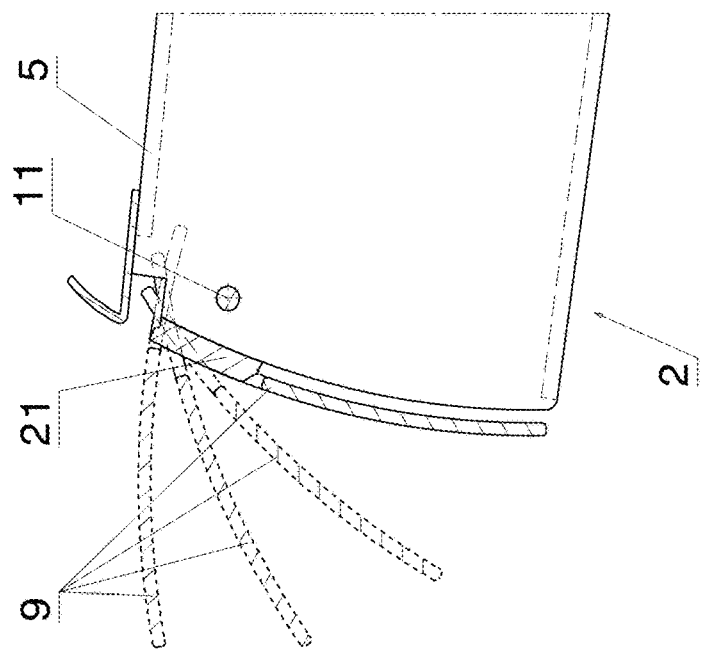
FIG. 6 shows a sectional view of the luggage compartment unit in the area of a covering part.
Figure 4:
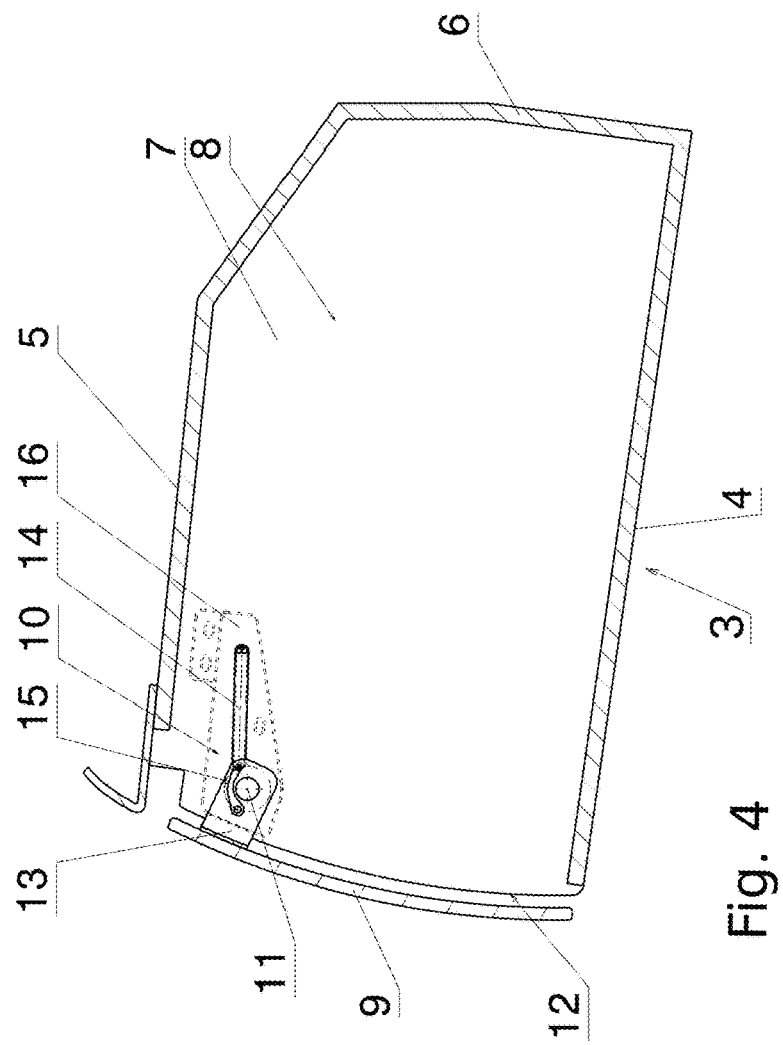
FIG. 4 shows a sectional view of the luggage compartment unit of FIG. 1 and FIG. 2 in the area of a pivoting device of one of the luggage compartments.

FIG. 1 shows a luggage compartment unit 1 which, in the embodiment shown, comprises two luggage compartments 2 arranged next to each other. The luggage compartment unit 1 is installed in an aircraft cabin (not shown) to enable hand luggage to be stowed during the flight. The luggage compartment housing 2 comprises a stationary luggage compartment housing 3 (i.e. arranged immovably when the luggage compartment housing 2 is opened) with a bottom part 4, a top part 5, a rear panel 6 and two opposing side panels 7, which enclose a storage space 8 for pieces of hand luggage in the interior. The luggage compartment housing 2 also comprises a door part 9, also referred to as a flap, which is connected to the luggage compartment housing 3 via a pivoting device 10. With the aid of the pivoting device 10, the door part 9 can be pivoted about a fixed pivot axis 11 from a closed position to an open position (and vice versa). In the closed position, a loading opening 12 leading into the storage space 8 is closed at the front of the luggage compartment housing 3 facing the user. In the open position, the storage space 8 can be loaded with luggage items via the loading opening 12.

Figure 5:
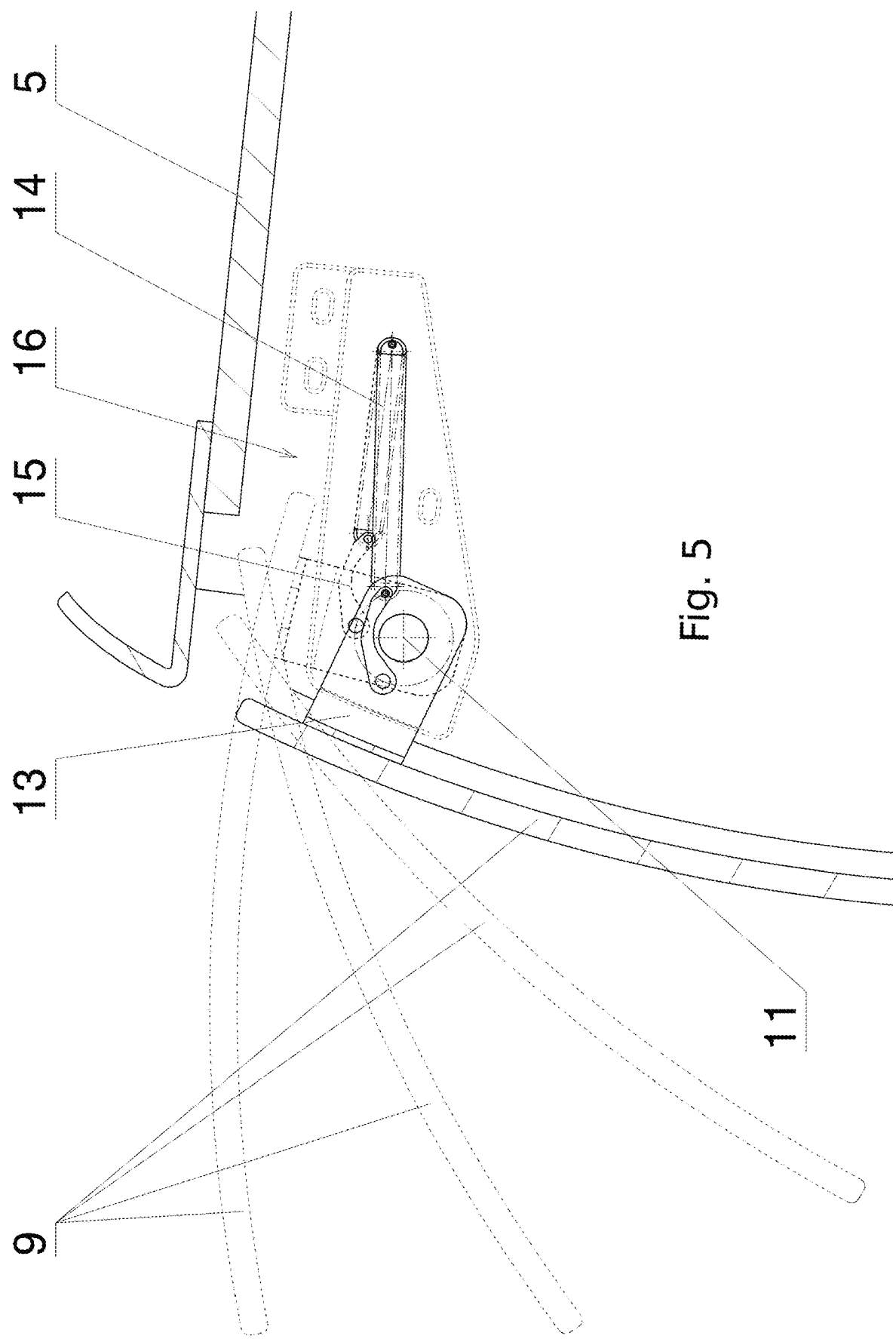
FIG. 5 shows a detailed view of the sectional view according to FIG. 4 in the closed position of the luggage compartment, whereby two intermediate positions and the open position of the door part are also indicated with dotted lines.

In the embodiment shown, the pivoting device 10 comprises a pivot arm 13 which is connected to the inside of the door part 9. The pivot arm 13 is pivotable about the pivot axis 11 in order to entrain the door part 9 from the closed position to the open position (and vice versa). In the embodiment shown, the pivoting device 10 also comprises a force support device with a spring and damper device 14. The spring and damper device 14 comprises a spring element, in this case a coil spring, which, when the door part 9 is pivoted from the closed position to the open position, releases the spring energy that was previously stored during pivoting from the open position to the closed position. In addition, the force support device comprises a damping element, which in the version shown is formed by a rotation damper arranged on the pivot axis 11. The pivoting device 10 is only shown schematically in the drawing and, as is known in the prior art, can be designed in a wide variety of embodiments. For example, the spring and damper device 14 can be connected to the pivot arm 13 via an intermediate lever 15. In this case, one end of the intermediate lever 15 can be articulated to the pivot arm 13 and the other end of the intermediate lever 15 can be articulated to the spring-damper 14. The intermediate lever 15 is arranged so that the lever arm to the pivot axis is smaller in the closed position than in the open position. The spring force, on the other hand, is greater in the closed position than in the open position. This achieves a favorable force curve between the closed and open positions. Furthermore, the pivoting device 10 may comprise an enclosure 16, which can only be seen schematically and which may, for example, be mounted on the inside of the side panel 7 of the luggage compartment housing 3. In FIG. 5 the door part is shown in the closed position, in the open position and two intermediate positions between the closed and open positions. For the sake of clarity, the pivoting device 10 is only shown in the positions corresponding to the closed and open positions of the door part 9.

According to the invention, the upper corner regions of the door part 9 are each formed with a cut-out or recess 17, so that an upper door section 9A and a lower door section 9B are formed. The upper door section 9 extends horizontally between the recesses 17. The lower door section 9B extends below the recesses 17. The recesses 17 are dimensioned and arranged in such a way that the upper door section 9 dips into the interior of the storage space 8 behind the loading opening 12 when it is moved into the open position. In this case, upper sections 18A of side edges 18 of the door part 9 are guided next to the inner sides (facing the storage space 8) of the side panels 7. Lower portions 18B of the side edges 18 project outwardly relative to the upper portions 18A such that, in the closed position, the lower portions 18B of the side edges 18 are substantially flush with the outer sides of the side panels 7 of the luggage compartment housing 3. When pivoting into the open position, an upper edge 19 of the door part 9 is displaced behind the pivot axis 11 into the interior of the storage space 8. As a result, a lower edge 20 of the door part 9 protrudes less far forward in the open position in the direction perpendicular to the loading opening 12.

In the embodiment shown, a fixed covering part 21, i.e. in particular a covering part which does not follow the pivoting of the door part 9, is connected to the luggage compartment housing 3 and fills the recess 17 in the closed position of the luggage compartment housing 3. If two luggage compartments 2 are arranged next to each other, a single covering part 21 can cover two adjacent recesses 17 of two corner regions of the luggage compartments 2 that meet. In the closed position, the outer side of the door part 9 (facing away from the storage space 8) is arranged essentially in the same plane as the outer side of the covering part 21.

The invention claimed is:
1. A luggage compartment unit for an aircraft, comprising:
a luggage compartment housing enclosing a storage space for hand luggage,
at least two luggage compartments defined in the housing,
at least two door parts,
a plurality of pivoting devices by means of which each door part can be pivoted between a closed position closing a loading opening of the respective luggage compartment and an open position releasing the loading opening of the respective luggage compartment,
a covering part located between two adjacent doors,
wherein:
each door part comprises a recess at an upper corner region, such that an adjoining section of each door part at a side of the recess is guided into an interior of the storage space during transfer from the closed position to the open position, and
in the closed position, the covering part substantially completely fills two adjacent recesses of two respective doors and is flush with an outer plane of the two respective doors.
2. Luggage compartment unit according to claim 1, wherein each door part comprises a recess at each of the two upper corner regions.
3. Luggage compartment unit according to claim 1, wherein each recess extends over less than half a length of a side edge of each door part.
4. Luggage compartment unit according to claim 1, wherein each recess is essentially rectangular in plan view.
5. Luggage compartment unit according to claim 1, wherein the covering part is connected to the luggage compartment housing, and wherein the covering part substantially completely fills each recess in the closed position of the luggage compartment housing.
6. Luggage compartment unit according to claim 5, wherein an outer side of each door part in the closed position is arranged essentially in the same plane as an outer side of the covering part.
7. Luggage compartment unit according to claim 1, wherein, in the closed position, a section of the side edge of each door part below each recess is essentially flush with the outside of a side panel of the luggage compartment housing.
8. Luggage compartment unit according to claim 1, wherein the pivoting device comprises a pivot arm which is connected in each case to a respective door part and a side panel of the luggage compartment housing.
9. Luggage compartment unit according to claim 1, wherein the pivoting device comprises a force support device to support the pivoting of the door part from the closed position into the open position.
10. An aircraft with the luggage compartment unit according to claim 1.
11. Luggage compartment unit of claim 3, wherein each recess extends over less than one third of the length of the side edge of each door part.
12. Luggage compartment unit according to claim 9, wherein the force support device comprises a spring and/or damper device.
13. Aircraft of claim 10, wherein the luggage compartment unit is an overhead luggage compartment.

* * * * *